United States Patent
Kawamura et al.

(12) 
(10) Patent No.: US 11,872,759 B2
(45) Date of Patent: Jan. 16, 2024

(54) LAMINATION MOLDING APPARATUS

(71) Applicant: SODICK CO., LTD., Kanagawa (JP)

(72) Inventors: Atsushi Kawamura, Kanagawa (JP);
Kensuke Kashimura, Kanagawa (JP);
Toshio Kaji, Kanagawa (JP);
Yoshifumi Ichikawa, Kanagawa (JP);
Yasuyuki Miyashita, Kanagawa (JP)

(73) Assignee: Sodick Co., Ltd., Kanagawa (JP)

(*) Notice: Subject to any disclaimer, the term of this patent is extended or adjusted under 35 U.S.C. 154(b) by 471 days.

(21) Appl. No.: 17/035,758

(22) Filed: Sep. 29, 2020

(65) Prior Publication Data

US 2021/0170526 A1    Jun. 10, 2021

(30) Foreign Application Priority Data

Dec. 4, 2019  (JP) ................. 2019-219664

(51) Int. Cl.
*B22F 12/49* (2021.01)
*B29C 64/277* (2017.01)
(Continued)

(52) U.S. Cl.
CPC ............ *B29C 64/277* (2017.08); *B22F 10/00* (2021.01); *B22F 10/28* (2021.01); *B22F 12/38* (2021.01);
(Continued)

(58) Field of Classification Search
CPC .................. B23K 15/086; B28B 1/001; B22F 2003/1057
See application file for complete search history.

(56) References Cited

U.S. PATENT DOCUMENTS

| 5,089,185 A | 2/1992 | Hirano et al. |
| 5,536,467 A | 7/1996 | Reichle et al. |

(Continued)

FOREIGN PATENT DOCUMENTS

| DE | 3560686 | * 10/2019 |
| EP | 3560686 | 10/2019 |

(Continued)

OTHER PUBLICATIONS

Boley, C.D. et al. "Calculation of laser absorption by metal powders in additive manufacturing." 2015. Optical Society of America. 54. 9. p.2477-2482 (Year: 2015).*

(Continued)

*Primary Examiner* — Nicholas A Wang
(74) *Attorney, Agent, or Firm* — JCIPRNET

(57) ABSTRACT

An irradiation device of a lamination molding apparatus includes: at least one laser source, generating a laser beam; a first galvano scanner, scanning the laser beam; a second galvano scanner, scanning the laser beam; and an irradiation controller, controlling the laser source, the first galvano scanner, and the second galvano scanner. Irradiable ranges of the laser beams by using the first galvano scanner and the second galvano scanner respectively include an entire of a molding region. A first X-axis galvano mirror and a first Y-axis galvano mirror of the first galvano scanner and a second X-axis galvano mirror and a second Y-axis galvano mirror of the second galvano scanner are disposed to be plane-symmetric to each other.

15 Claims, 13 Drawing Sheets

(51) Int. Cl.
*B23K 26/082* (2014.01)
*B22F 10/00* (2021.01)
*B22F 12/00* (2021.01)
*B22F 10/28* (2021.01)
*B22F 12/44* (2021.01)
*B33Y 30/00* (2015.01)
*B22F 12/41* (2021.01)
*B22F 12/45* (2021.01)
*B22F 12/67* (2021.01)
*B22F 10/32* (2021.01)

(52) U.S. Cl.
CPC ............. *B22F 12/44* (2021.01); *B22F 12/49* (2021.01); *B23K 26/0821* (2015.10); *B22F 10/32* (2021.01); *B22F 12/41* (2021.01); *B22F 12/45* (2021.01); *B22F 12/67* (2021.01); *B33Y 30/00* (2014.12)

(56) References Cited

U.S. PATENT DOCUMENTS

| | | | |
|---|---|---|---|
| 5,985,204 A | 11/1999 | Otsuka et al. | |
| 7,665,979 B2 | 2/2010 | Heugel | |
| 9,138,807 B1* | 9/2015 | Takezawa | B22F 10/20 |
| 9,314,972 B2 | 4/2016 | Green | |
| 9,931,789 B2 | 4/2018 | Wiesner et al. | |
| 10,029,333 B2 | 7/2018 | Green | |
| 2013/0112672 A1 | 5/2013 | Keremes et al. | |
| 2015/0352668 A1* | 12/2015 | Scott | B29C 64/268 |
| | | | 219/76.1 |
| 2017/0021572 A1 | 1/2017 | Wiesner et al. | |
| 2017/0173883 A1* | 6/2017 | Gray | B29C 64/277 |
| 2018/0215095 A1* | 8/2018 | Amaya | B33Y 30/00 |
| 2018/0339454 A1* | 11/2018 | Franklin | B29C 64/277 |
| 2019/0151945 A1 | 5/2019 | Okazaki | |
| 2019/0375012 A1* | 12/2019 | Wiesner | B33Y 30/00 |

FOREIGN PATENT DOCUMENTS

| | | | |
|---|---|---|---|
| GB | WO2014199134 | * | 12/2014 |
| JP | 2007167826 | * | 1/2009 |
| JP | 6405028 | | 10/2018 |
| WO | 2014199134 | | 12/2014 |
| WO | 2014199149 | | 12/2014 |

OTHER PUBLICATIONS

English translation of "Office Action of Japan Counterpart Application", dated Aug. 18, 2020, pp. 1-7.
"Search Report of Europe Counterpart Application", dated Mar. 16, 2021, pp. 1-11.

* cited by examiner

LAMINATION MOLDING APPARATUS

CROSS-REFERENCE TO RELATED APPLICATION

This application claims the priority benefit of Japan application serial no. 2019-219664, filed on Dec. 4, 2019. The entirety of the above-mentioned patent application is hereby incorporated by reference herein and made a part of this specification.

BACKGROUND

Technical Field

The disclosure relates to a lamination molding apparatus.

Description of Related Art

Various methods have been known as lamination molding methods for a three-dimensional molded object. As an example, a lamination molding apparatus which carries out powder bed fusion forms a material layer on a molding region, which is a region in which the desired three-dimensional molded object is formed. Then, the lamination molding apparatus sinters or melts the material layer and forms a solidified layer by scanning a laser beam at a predetermined position of the material layer. Then, the lamination molding apparatus repeats the formation of the material layer and the formation of the solidified layer to laminate a plurality of solidified layers and thereby produce the three-dimensional molded object.

As a scanning means for irradiating the laser beam to the predetermined position, a galvano scanner may be used. The galvano scanner includes two galvano mirrors that reflect the laser beam and an actuator that rotates each galvano mirror to a predetermined angle.

US Patent Publication No. 2019/0151945 has disclosed a lamination molding apparatus including a plurality of galvano scanners to simultaneously irradiate laser beams to a plurality of positions in the molding region.

SUMMARY

Problem to be Solved

From the perspective of speeding up the molding, it is favorable that a plurality of galvano scanners can be simultaneously used regardless of the shape or the position of the molded object. In other words, it is desirable that the irradiable ranges of the laser beams of the respective galvano scanners cover the entire molding region. Besides, from the perspective of stabilizing the molding quality, it is desirable that the shape of the irradiation spot as well as the energy density of the laser beam irradiated to the predetermined position are substantially constant regardless of which galvano scanner is used for scanning. In other words, it is desirable that the difference be as little as possible among the incident angles of the laser beams scanned by the respective galvano scanners.

The disclosure has been made in view of the above circumstances, and provides a lamination molding apparatus including a plurality of galvano scanners which increases the molding speed as well as stabilizing the molding quality.

Means for Solving the Problems

According to the disclosure, a molding lamination apparatus is provided. The molding lamination apparatus includes: a chamber, covering a molding region; and an irradiation device, in each divided layer formed by dividing a desired three-dimensional molded object at a predetermined height, irradiating a laser beam to a material layer formed in the molding region to form a solidified layer. The irradiation device includes at least one laser source, generating the laser beam; a first galvano scanner, scanning the laser beam; a second galvano scanner, scanning the laser beam; and an irradiation controller, controlling the at least one laser source, the first galvano scanner, and the second galvano scanner. The first galvano scanner includes: a first X-axis galvano mirror, scanning the laser beam in an X-axis direction; a first X-axis actuator, rotating the first X-axis galvano mirror; a first Y-axis galvano mirror, scanning the laser beam in a Y-axis direction perpendicular to the X-axis direction; and a first Y-axis actuator, rotating the first Y-axis galvano mirror. The second galvano scanner includes: a second X-axis galvano mirror, scanning the laser beam in the X-axis direction; a second X-axis actuator, rotating the second X-axis galvano mirror; a second Y-axis galvano mirror, scanning the laser beam in the Y-axis direction; and a second Y-axis actuator, rotating the second Y-axis galvano mirror. Irradiable ranges of the laser beams by using the first galvano scanner and the second galvano scanner respectively include the entire molding region. The first X-axis galvano mirror and the first Y-axis galvano mirror are disposed to be plane-symmetric to the second X-axis galvano mirror and the second Y-axis galvano mirror.

Inventive Effects

In the lamination molding apparatus according to the disclosure, the irradiable ranges of the laser beams by using the first galvano scanner and the second galvano scanner include the entire molding region. In addition, the first X-axis galvano mirror and the first Y-axis galvano mirror of the first galvano scanner, and the second X-axis galvano mirror and the second Y-axis galvano mirror of the second galvano scanner are disposed to be plane-symmetric to each other. Accordingly, the molding can be performed more efficiently regardless of the shape or the position of the molded object. In addition, by disposing the first galvano scanner and the second galvano scanner to be close, the difference between the incident angles of the respective galvano scanners can be decreased, and the molding quality can be stabilized.

DESCRIPTION OF THE EMBODIMENTS

In the following, the embodiments of the disclosure will be described with reference to the drawings. The various features shown in the following embodiments may be combined with each other. In addition, the disclosure is independently established for each feature.

Figure 1:
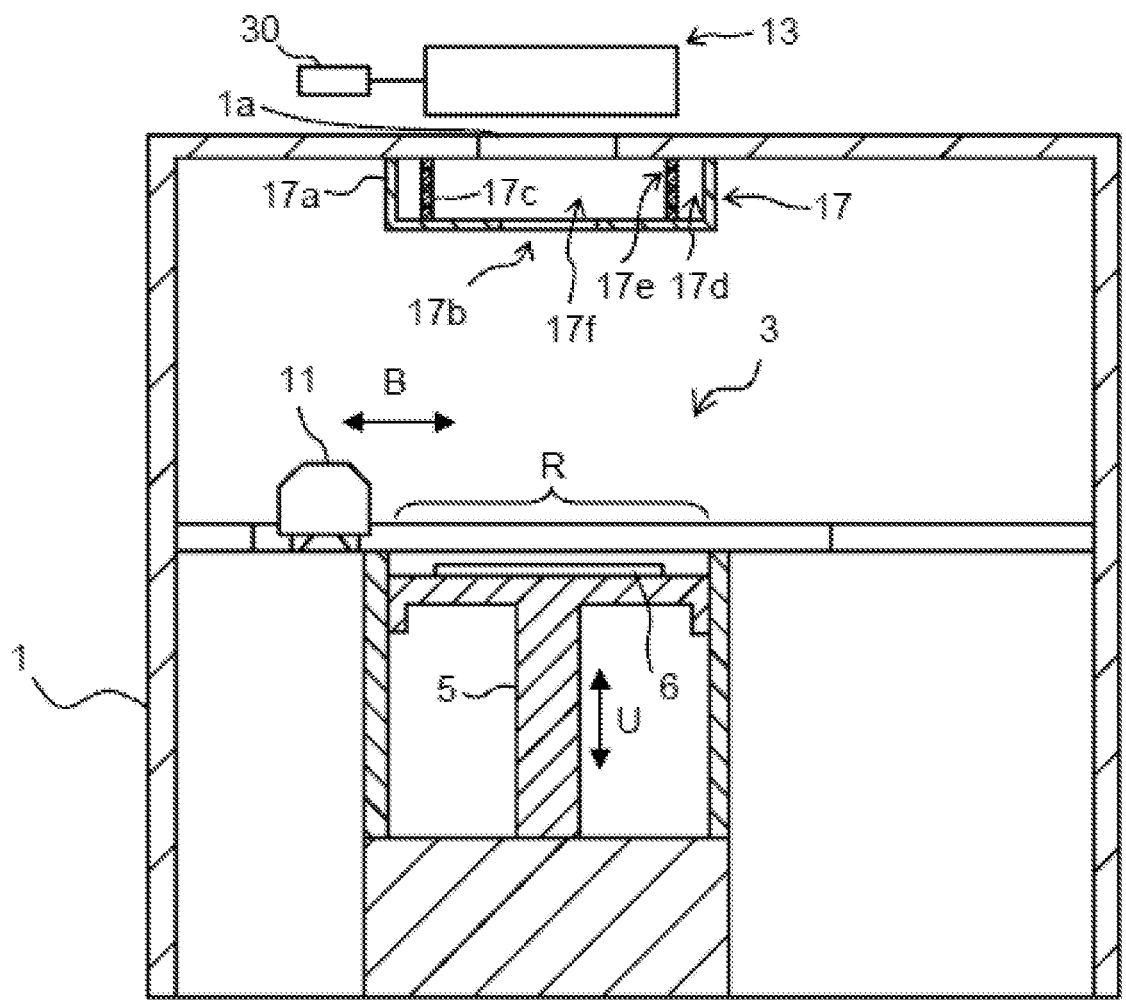
FIG. 1 is a schematic view illustrating the configuration of a lamination molding apparatus according to a first embodiment of the disclosure.

A lamination molding apparatus of the embodiment, in each divided layer formed by dividing a desired three-dimensional molded object at a predetermined thickness, repetitively forms a material layer 8 and forms a solidified layer to form a three-dimensional molded object. As shown in FIG. 1, the lamination molding apparatus according to the first embodiment of the disclosure includes a chamber 1, a material layer forming device 3, and an irradiation device 13.

The chamber 1 covers a molding region R required as a region for forming the desired three-dimensional molded object. An inert gas having a predetermined concentration is supplied from an inert gas supplier to the chamber 1. In addition, the inert gas containing fumes generated during formation of a solidified layer is discharged from the chamber 1. The inert gas supplier is, for example, an inert gas generator that generates the inert gas at the predetermined concentration from surrounding air or a gas cylinder that stores the inert gas at the predetermined concentration. Preferably, the fumes of the inert gas discharged from the chamber 1 may be removed by a fume collector, and the inert gas may be returned to the chamber 1. The fume collector is, for example, an electric precipitator or a filter. In the disclosure, the inert gas is a gas that does not substantially react with the material layer 8 or the solidified layer, and, in response to the type of the molding material, may be a suitable gas selected from a nitrogen gas, an argon gas, a helium gas, etc.

On a top surface of the chamber 1, a chamber window 1*a* for laser beams L1 and L2 to pass through is disposed. The chamber window 1*a* is formed by a material which the laser beams L1 and L2 can pass through. Specifically, the material of the chamber window 1*a*, in response to the type of the laser beams L1 and L2, may be selected from quartz glass or borosilicate glass, or crystals of germanium, silicon, zinc selenium or potassium bromide. For example, in the case where the laser beams L1 and L2 are fiber laser or YAG laser, the chamber window 1*a* may be formed by quartz glass.

In addition, on the top surface of the chamber 1, a fume diffuser 17 covering the chamber window 1*a* is disposed. The fume diffuser 17 includes a cylindrical casing 17*a* and a cylindrical diffusing member 17*c* disposed in the casing 17*a*. An inert gas supply space 17*d* is defined between the casing 17*a* and the diffusing member 17*c*. In addition, on a bottom surface of the casing 17*a*, an opening 17*b* is provided on an inner side of the diffusing member 17*c*. A plurality of pores 17*e* are provided on the diffusing member 17*c*, and the clean inert gas supplied to the inert gas supply space 17*d* fills a clean room 17*f* through the pores 17*e*. The clean inert gas that fills the clean room 17*f* is then jetted toward a bottom of the fume diffuser 17 through the opening 17*b*. With such configuration, the fume can be prevented from attaching to the chamber window 1*a*, and the fumes can be eliminated from an irradiation path of the laser beams L1 and L2.

Figure 2:
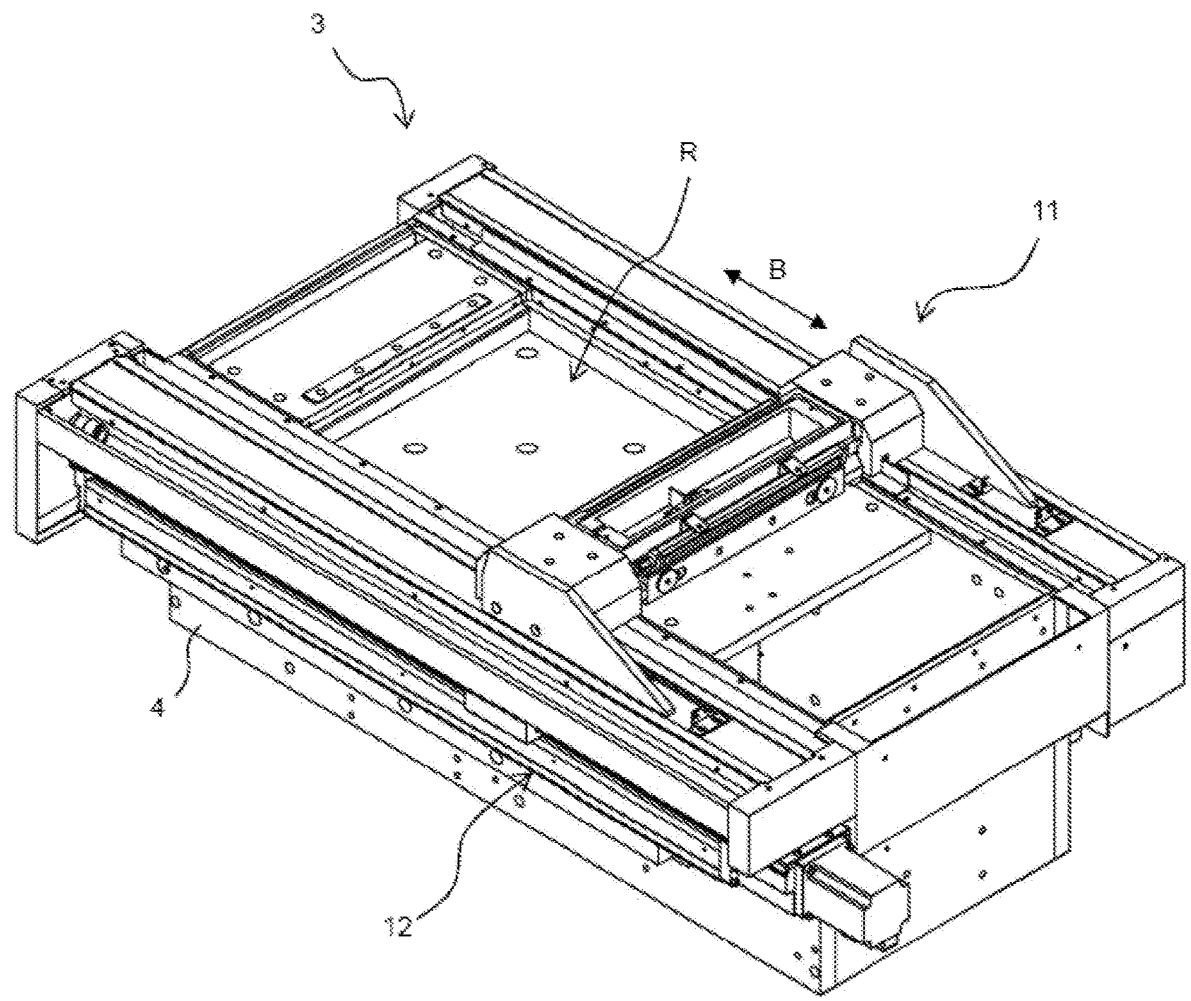
FIG. 2 is a perspective view illustrating a material layer forming device 3 of the lamination molding apparatus of FIG. 1.

The material layer forming device 3 is disposed in the chamber 1. As shown in FIG. 2, the material layer forming device 3 includes a base 4 provided with the molding region R and a recoater head 11 disposed on the base 4. The recoater head 11 is configured to be reciprocally movable in a horizontal direction (the direction of an arrow B) by a recoater head driving mechanism 12.

Figure 3:
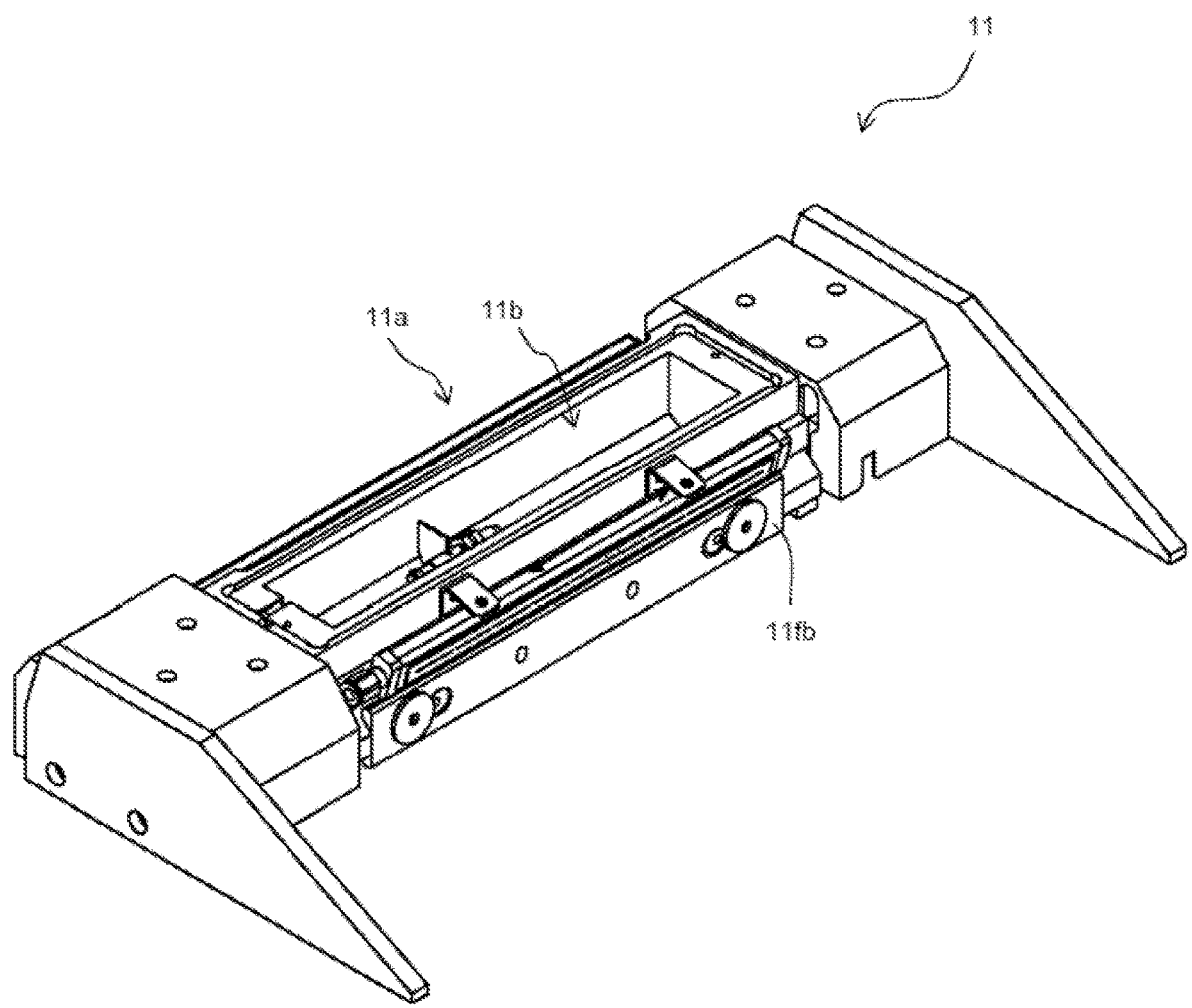
FIG. 3 is a perspective view illustrating a recoater head 11 from a top perspective.
Figure 4:
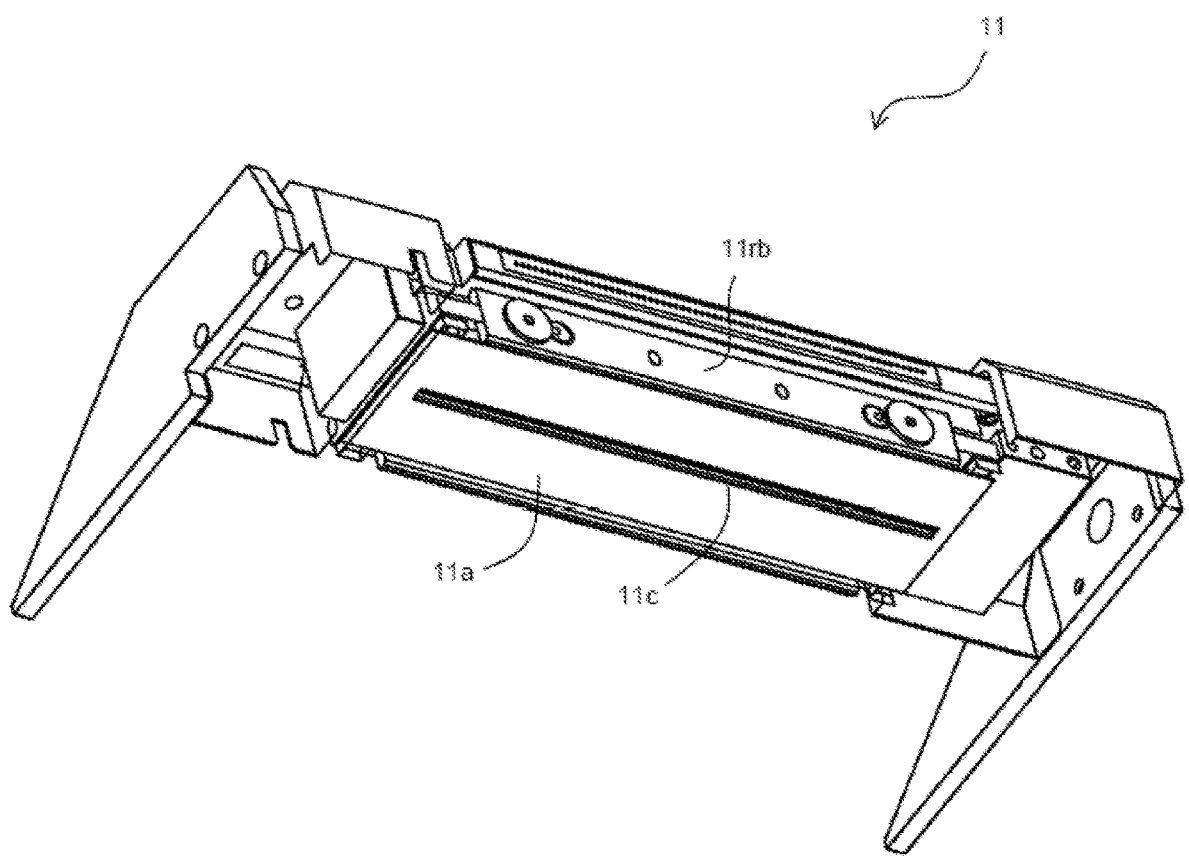
FIG. 4 is a perspective view illustrating the recoater head 11 from a bottom perspective.

As shown in FIGS. 3 and 4, the recoater head 11 includes a material container 11*a*, a material supply port 11*b*, and a material discharge port 11*c*. In the embodiment, a metallic material powder is used as the molding material for forming the material layer 8.

The material supply port 11*b* is disposed on a top surface of the material container 11*a*, and is a receiving port of the material powder supplied from a material supply unit (not shown) to the material container 11*a*. The material discharge port 11*c* is disposed on a bottom surface of the material container 11*a* and discharges the material powder in the material container 11*a*. The material discharge port 11*c* has a slit shape that extends in a longitudinal direction of the material container 11*a*. Blades 11*fb* and 11*rb* are provided on two side surfaces of the recoater head 11, respectively. The blades 11*fb* and 11*rb* planarize the material powder discharged from the material discharge port 11*c* to form the material layer 8.

As shown in FIGS. 1 and 2, the molding region R is positioned on a molding table 5. The molding table 5 is movable in a vertical direction (the direction of an arrow U) by a molding table driving mechanism (not shown). At the time of molding, a base plate 6 is disposed on the molding table 5, and the material layer 8 is formed on the base plate 6.

Figure 5:
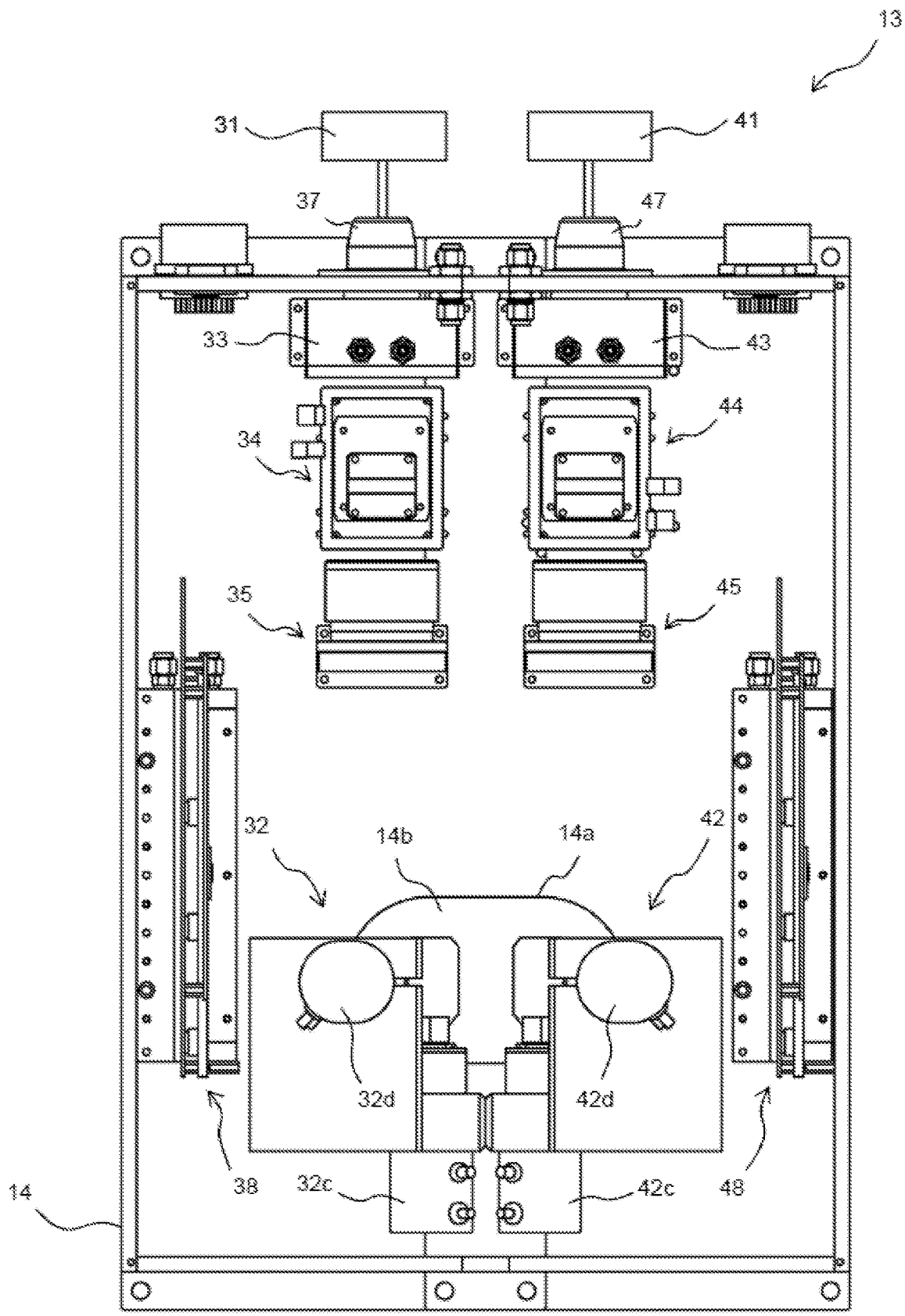
FIG. 5 is a top view illustrating an irradiation device 13 according to the first embodiment.

As shown in FIG. 1, the irradiation device 13 is disposed above the chamber 1. The irradiation device 13 irradiates the laser beams L1 and L2 to a predetermined position of the material layer 8 formed on the molding region R to melt or sinter and solidify the material layer 8 at the irradiation position. As shown in FIGS. 1 and 5, the irradiation device 13 includes a first laser source 31, a second laser source 41, a first aperture 33, a second aperture 43, a first focus control unit 34, a second focus control unit 44, a first adjustment lens 35, a second adjustment lens 45, a first galvano scanner 32, a second galvano scanner 42, and an irradiation controller 30. In the following, a horizontal direction in the molding region R is set as an X-axis, and a horizontal direction perpendicular to the X-axis is set as a Y-axis. In addition, along the paths of the laser beams L1 and L2, a side relatively close to the first laser source 31 or the second laser source 41 is set as an upstream side, and a side relatively close to the material layer 8 is set as a downstream side.

The first laser source 31 generates the laser beam L1, and the second laser source 41 generates the laser beam L2. The laser beams L1 and L2 may be any laser beams as long as they are capable of sintering or melting the material powder.

Examples of the laser beams L1 and L2 include fiber laser, CO2 laser, and YAG laser. In the embodiment, fiber laser is used. As described in the following, while the laser beams L1 and L2 generated by the two laser sources 31 and 41 are respectively scanned by the first galvano scanner 32 and the second galvano scanner 42 in the embodiment, it may also be that the laser beam generated by one laser source is split, and the split laser beams are respectively scanned by the first galvano scanner 32 and the second galvano scanner 42.

Figure 6:
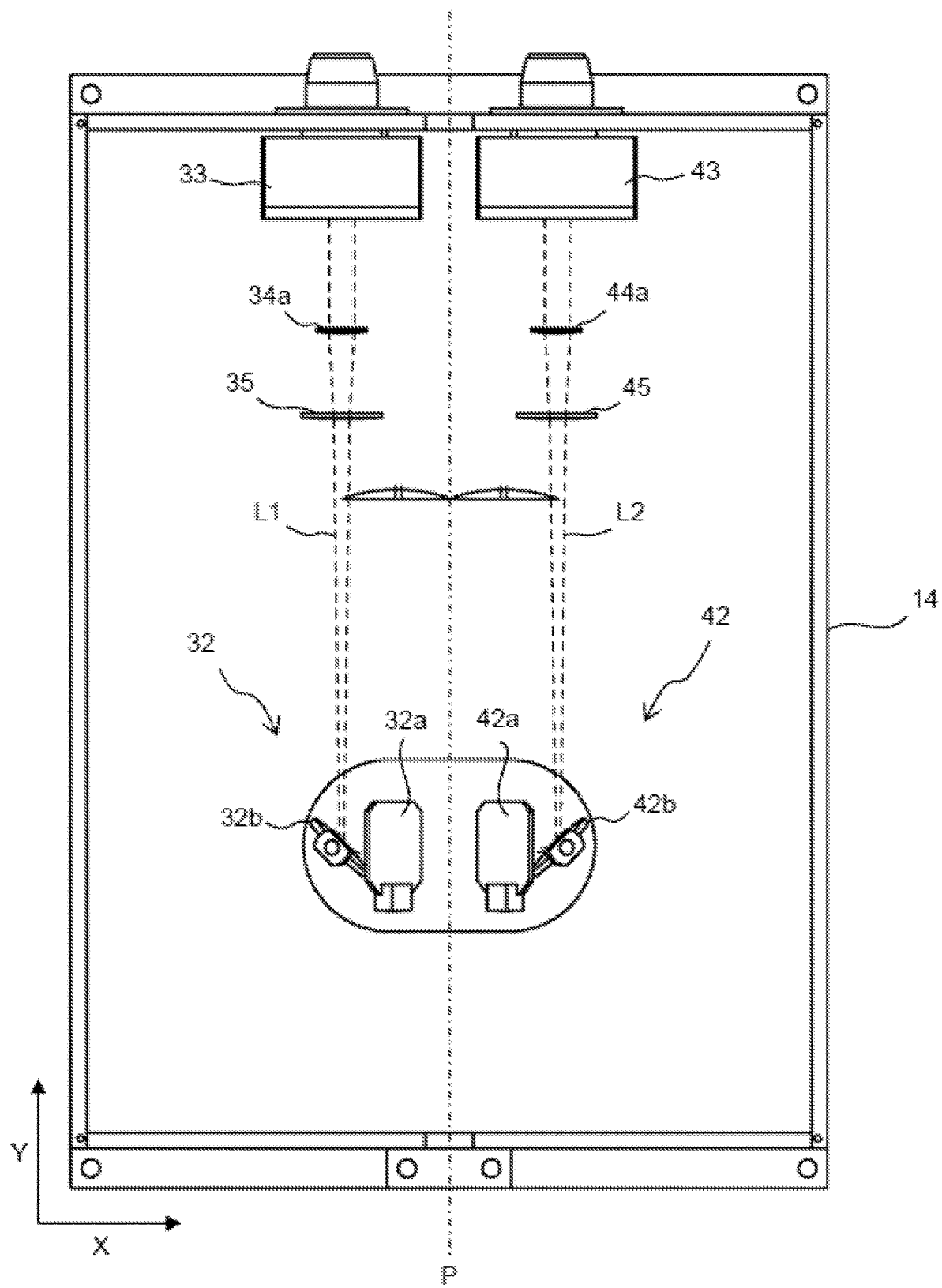
FIG. 6 illustrates the configuration of a portion of components of the irradiation device 13 of FIG. 5.

As shown in FIGS. 5 and 6, the first aperture 33, the second aperture 43, the first focus control unit 34, the second focus control unit 44, the first adjustment lens 35, the second adjustment lens 45, the first galvano scanner 32, and the second galvano scanner 42 are integrally disposed in a casing 14 having an opening 14a at a bottom. In other words, the single casing 14 accommodates the first galvano scanner 32 and the second galvano scanner 42. In the opening 14a, an irradiation device window 14b that the laser beams L1 and L2 pass through is disposed. The irradiation device window 14b is formed by a material which the laser beams L1 and L2 can pass through. Specifically, the material of the irradiation device window 14b, in response to the type of the laser beams L1 and L2, may be selected from quartz glass or borosilicate glass, or crystals of germanium, silicon, zinc selenium or potassium bromide. For example, in the case where the laser beams L1 and L2 are fiber laser or YAG laser, the irradiation device window 14b may be configured by quartz glass. In addition, in the casing 14, a first control substrate 38 electrically connected with the first galvano scanner 32 and the first focus control unit 34 and a second control substrate 48 electrically connected with the second galvano scanner 42 and the second focus control unit 44 are disposed. The first galvano scanner 32 includes a first X-axis galvano mirror 32a, a first X-axis actuator 32c, a first Y-axis galvano mirror 32b, and a first Y-axis actuator 32d. The second galvano scanner 42 includes a second X-axis galvano mirror 42a, a second X-axis actuator 42c, a second Y-axis galvano mirror 42b, and a second Y-axis actuator 42d.

The first laser source 31 is connected with the first aperture 33 via a connector 37 disposed on a back surface of the casing 14. The second laser source 41 is connected with the second aperture 43 via a connector 47 disposed on the back surface of the casing 14. The first aperture 33 and the second aperture 43 serve as diaphragms that allow a central portions of the laser beams L1 and L2 from the first laser source 31 and the second laser source 41 to pass through. Accordingly, an energy distribution of the irradiated laser beams L1 and L2 can be stabilized.

The first focus control unit 34 includes a focus control lens 34a inside. The second focus control unit 44 includes a focus control lens 44a inside. The focus control lenses 34a and 44a in the embodiment are plano-convex lenses which, along the respective paths of the laser beams L1 and L2 from the first laser source 31 and the second laser source 41, are planar on the upstream side and convex on the downstream side. The focus control lenses 34a and 44a are forward/backward-movable by motors incorporated in the focus control units 34 and 44 along the paths of the laser beams L1 and L2, and therefore can adjust spot diameters of the laser beams L1 and L2 that pass through the respective focus control lenses 34a and 44a. The spot diameters of the laser beams L1 and L2 are controlled by driving currents input to the motors of the focus control units 34 and 44 based on command signals received from the irradiation controller 30 via the control substrates 38 and 48.

The laser beams L1 and L2 that respectively pass through the focus control lenses 34a and 44a are respectively condensed by the first adjustment lens 35 and the second adjustment lens 45. The first adjustment lens 35 and the second adjustment lens 45 of the embodiment are plano-convex lenses which, along the respective paths of the laser beams L1 and L2, planar on the upstream side and convex on the downstream side. Positions of the first adjustment lens 35 and the second adjustment lens 45 can be adjusted manually, and the first adjustment lens 35 and the second adjustment lens 45 serve to fine-tune the spot diameters that may cause an error in attaching the device, etc.

Figure 7:
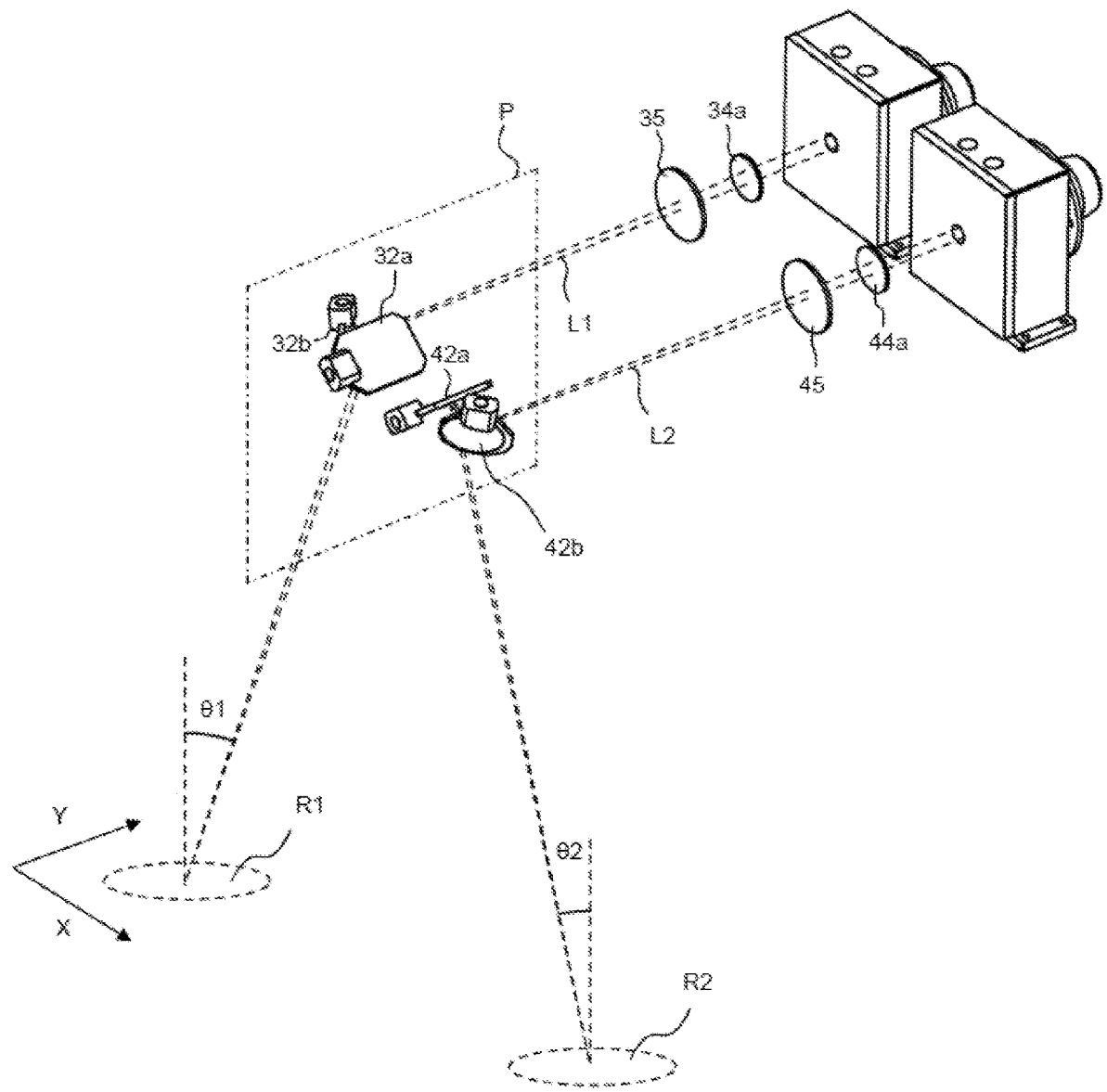
FIG. 7 illustrates an example of laser beams irradiated by the irradiation device 13.

As shown in FIGS. 6 and 7, the first galvano scanner 32 controllably two-dimensionally scans the laser beam L1 that passes through the first adjustment lens 35. Specifically, the laser beam L1 is reflected by the first X-axis galvano mirror 32a rotated by the first X-axis actuator 32c and scanned in the X-axis direction of the molding region R, and is reflected by the first Y-axis galvano mirror 32b rotated by the first Y-axis actuator 32d and scanned in the Y-axis direction of the molding region R. Rotation angles of the first X-axis galvano mirror 32a and the first Y-axis galvano mirror 32b are controlled by driving currents input to the first X-axis actuator 32c and the first Y-axis actuator 32d based on command signals received from the irradiation controller 30 via the control substrate 38. Here, the first galvano scanner 32 is configured as being capable of irradiating any position in the molding region R. In other words, the irradiable range of the first galvano scanner 32 includes the entire molding region R.

The second galvano scanner 42 controllably two-dimensionally scans the laser beam L2 that passes through the second adjustment lens 45. Specifically, the laser beam L2 is reflected by the second X-axis galvano mirror 42a rotated by the second X-axis actuator 42c and scanned in the X-axis direction of the molding region R, and is reflected by the second Y-axis galvano mirror 42b rotated by the second Y-axis actuator 42d and scanned in the Y-axis direction of the molding region R. Rotation angles of second X-axis galvano mirror 42a and the second Y-axis galvano mirror 42b are controlled by driving currents input to the second X-axis actuator 42c and the second Y-axis actuator 42d based on command signals received from the irradiation controller 30 via the control substrate 48. Here, the second galvano scanner 42 is configured as being capable of irradiating any position in the molding region R. In other words, the irradiable range of the second galvano scanner 42 includes the entire molding region R.

In FIGS. 6 and 7, a symmetry plane P is a plane that is equidistant from an optical axis of the laser beams L1 and L2 passing through the adjustment lenses 35 and 45 and is perpendicular to the molding region R. The first X-axis galvano mirror 32a and the first Y-axis galvano mirror 32b of the first galvano scanner 32 and the second X-axis galvano mirror 42a and the second Y-axis galvano mirror 42b of the second galvano scanner 42 are disposed to be plane-symmetric to each other with respect to the symmetry plane P. As shown in FIGS. 6 and 7, when the side relatively close to the laser source 31 and 41 is set as the upstream side, and the side relatively close to the material layer 8 is set as the downstream side along the paths of the laser beams L1 and L2, the first X-axis galvano mirror 32a and the first Y-axis galvano mirror 32b of the first galvano scanner 32 and the second X-axis galvano mirror 42a and the second Y-axis galvano mirror 42b of the second galvano scanner 42 are disposed to be plane-symmetric to each other with respect to the symmetry plane P which is perpendicular to the molding region R, so that a distance between the downstream galvano mirror of the first X-axis galvano mirror 32a and the first Y-axis galvano mirror 32b of the first galvano scanner 32 (i.e., the first X-axis galvano mirror 32a in the embodiment) and the downstream galvano mirror of the second X-axis galvano mirror 42a and the second Y-axis galvano mirror 42b of the second galvano scanner 42 (i.e., the second X-axis galvano mirror 42a in the embodiment) is smaller than a distance between the upstream galvano mirror of the first X-axis galvano mirror 32a and the first Y-axis galvano mirror 32b of the first galvano scanner 32 (i.e., the first Y-axis galvano mirror 32b in the embodiment) and the upstream galvano mirror of the second X-axis galvano mirror 42a and the second Y-axis galvano mirror 42b of the second galvano scanner 42 (i.e., the second Y-axis galvano mirror 42b in the embodiment).

It is desirable that the first galvano scanner 32 and the second galvano scanner 42 be disposed to be closer to each other within the extent that the first galvano scanner 32 and the second galvano scanner 42 do not physically interfere with each other. In other words, it is preferable that a distance between reflected positions of the laser beams L1 and L2 on the downstream side in the respective galvano scanners 32 and 42 be shorter. Specifically, it is preferable that the respective galvano scanners 32 and 42 may be disposed so that the distance between the first reflected position of the laser beam L1 of the downstream galvano mirror of the first X-axis galvano mirror 32a and the first Y-axis galvano mirror 32b of the first galvano scanner 32 (i.e., the reflected position in the first X-axis galvano mirror 32a in the embodiment) and the second reflected position of the laser beam L2 of the downstream galvano mirror of the second X-axis galvano mirror 42a and the second Y-axis galvano mirror 42b of the second galvano scanner 42 (i.e., the reflected position in the second X-axis galvano mirror 42a in the embodiment), when the laser beams L1 and L2 are irradiated, is preferably constantly 150 mm or less, and more preferably 100 mm or less. Since the first galvano scanner 32 and the second galvano scanner 42 are disposed so as to be plane-symmetric with each other, the physical interference does not occur, and the first galvano scanner 32 and the second galvano scanner 42 can be disposed with the distance between the first reflected position and the second reflected position being 150 mm or less.

In FIG. 7, a first incident angle of the laser beam L1 on an incident plane at the time when the laser beam L1 is irradiated to a predetermined position in the molding region R by the first galvano scanner 32 with respect to the vertical direction is set as $\theta 1[°]$, and a second incident angle of the laser beam L2 on an incident plane at the time when the laser beam L2 is irradiated to a predetermined position in the molding region R by the second galvano scanner 42 with respect to the vertical direction is set as $\theta 2[°]$. In addition, the laser beams L1 and L2 respectively form irradiation spots R1 and R2 on the material layer 8 in the molding region R. Here, the irradiation spot refers to the shape of the laser beam at the irradiation position. As will be described in the following, in order to further reduce the difference between the energy densities or the shapes of the irradiation spots R1 and R2 to reduce the variation in the molding quality, it is desirable that the difference between the first incident angle $\theta 1$ and the second incident angle $\theta 2$ be smaller. In the embodiment, the irradiation device 13 is configured so that, at any position in the molding region R, the absolute value of the difference between the first incident angle $\theta 1$ and the second incident angle $\theta 2$ at the time when the laser beams L1 and L2 are irradiated is constantly 7 degrees or less, and more preferably 3 degrees or less.

The position of the irradiation device 13 in the horizontal direction is preferably configured so that the reflected positions of the laser beams L1 and L2 of the downstream galvano mirrors of the first galvano scanner 32 and the second galvano scanner 42 are positioned above the substantially central position of the molding region R.

Figure 8:
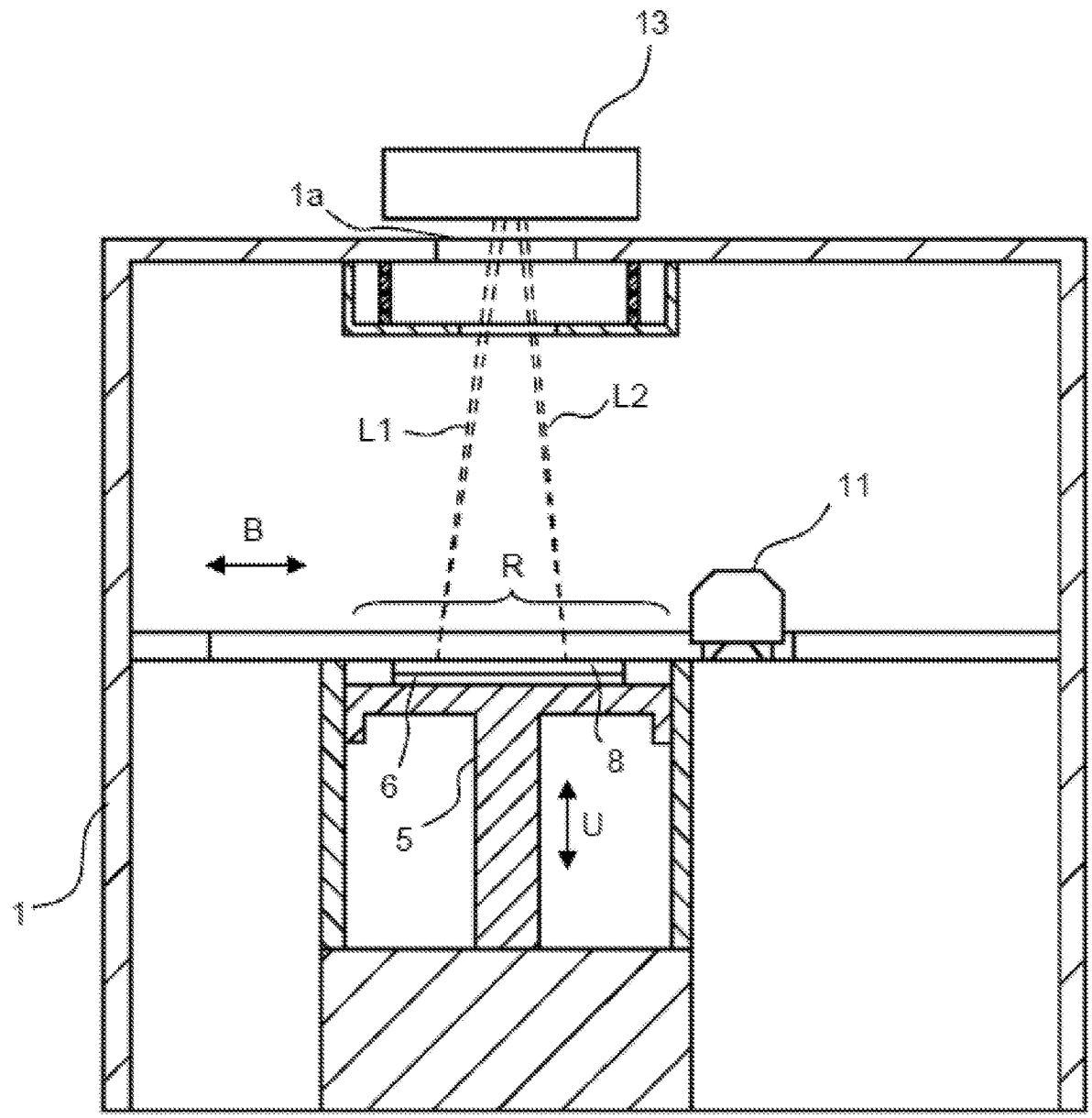
FIG. 8 illustrates a lamination molding method using the lamination molding apparatus according to the first embodiment.

As shown in FIG. 8, the laser beams L1 and L2 passing through the first galvano scanner 32 and the second galvano scanner 42 pass through the irradiation device window 14b and the chamber window 1a to be irradiated to the predetermined positions of the material layer 8 formed on the molding region R. Since the reflected positions of the laser beams L1 and L2 of the downstream galvano mirrors are configured to be positioned above the substantially central position of the molding region R, a transmission window for the laser beams L1 and L2 in the chamber 1 can be configured by the relatively smaller chamber window 1a. In other words, the laser beam L1 scanned by the first galvano scanner 32 and the laser beam L2 scanned by the second galvano scanner 42 pass through the single chamber window 1a. Therefore, the chamber window 1a can be more easily cleaned and replaced.

The irradiation controller 30 includes a hardware component in which a processor, a memory, various circuits are properly assembled. The irradiation controller 30 analyzes a molding program file including specific commands relating to the scan paths of the laser beams L1 and L2 that are transmitted from a numerical control device not shown herein and generates laser beam irradiation data. In addition, the irradiation controller 30 transmits desired command signals based on the laser beam irradiation data, and the driving currents whose magnitudes correspond to the command signals are input to the actuators 32c and 32d of the first galvano scanner 32 and the actuators 42c, and 42d of the second galvano scanner 42. With the driving currents, the respective galvano mirrors 32a, 32b, 42a, and 42b form the desired rotation angles. Accordingly, the irradiation positions of the laser beams L1 and L2 on the molding region R are determined. In addition, the irradiation controller 30 controls the laser sources 31 and 41 and performs control relating to on/off, intensity, etc., of the laser beams L1 and L2.

Nevertheless, the irradiation device 13 is not limited to the above. For example, an fθ lens may be disposed in place of the first focus control unit 34 and the second focus control unit 44. In addition, while the focus control lenses 34a and 44a in the first focus control unit 34 and the second focus control unit 44 of the embodiment are condensing lenses, diffusing lenses may also be used as the focus control lenses 34a and 44a. In addition, while the first X-axis galvano mirror 32a and the second X-axis galvano mirror 42a are disposed on the downstream side in the first galvano scanner 32 and the second galvano scanner 42, the first Y-axis galvano mirror 32b and the second Y-axis galvano mirror 42b may also be disposed on the downstream side. Nevertheless, it is desirable that the intensities, types of the respective laser beams L1 and L2, the types of the optical members which the respective laser beams L1 and L2 pass through, and the reflectances of the respective galvano mirrors 32a, 32b, 42a, and 42b be the same.

In the following, a method for manufacturing a lamination molded object by using the lamination molding apparatus will be described.

Firstly, as shown in FIG. 1, the height of the molding table 5 is adjusted to a suitable position in the state in which the base plate 6 is mounted on the molding table 5. In this state, the recoater head 11 is moved from the left side of the molding region R to the right side in the direction of the arrow B, and, as shown in FIG. 8, the first material layer 8 is formed on the molding table 5.

Figure 9:
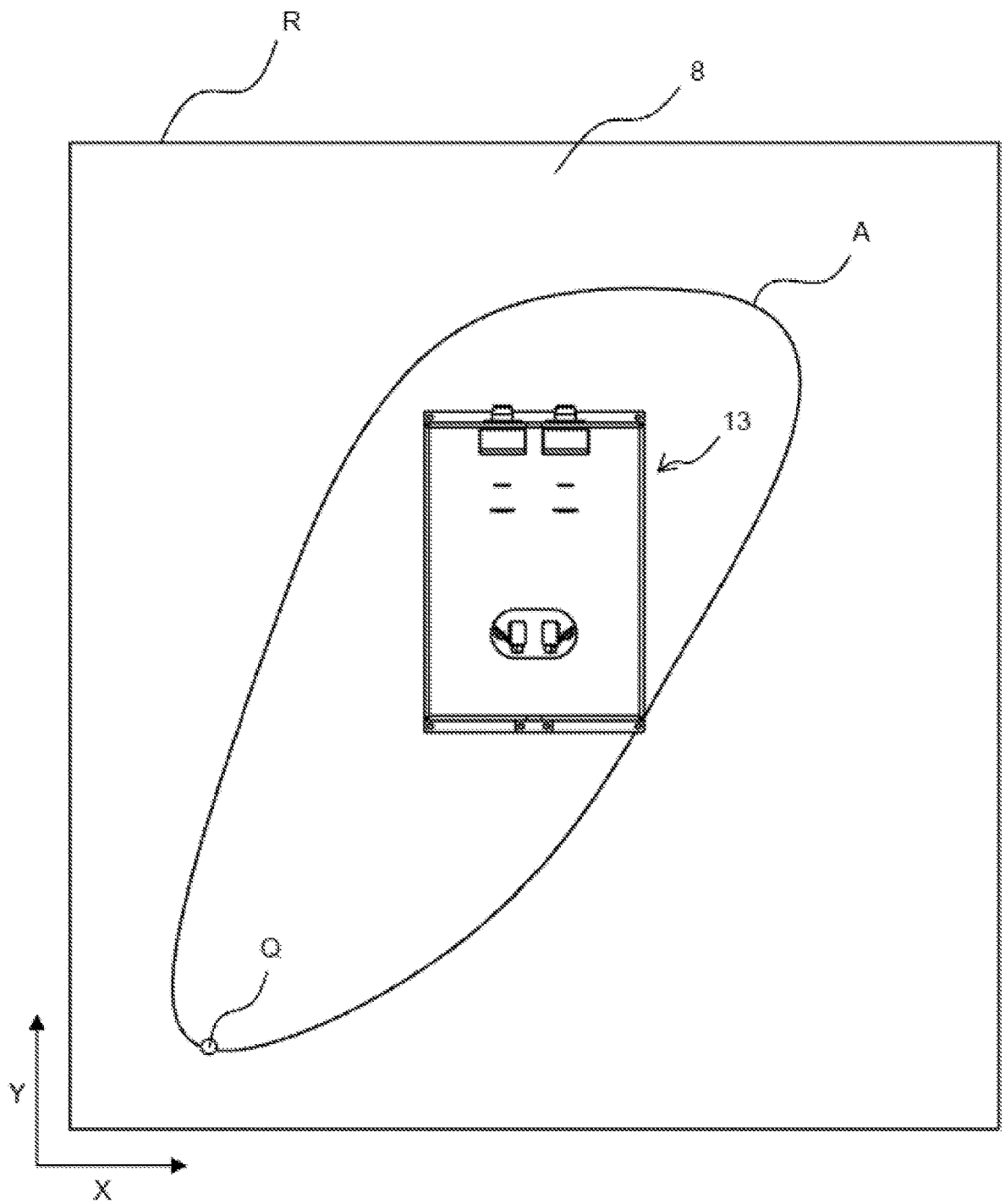
FIG. 9 illustrates a position relationship between the irradiation device 13 and a molding region R according to the first embodiment from a top perspective.
Figure 10:
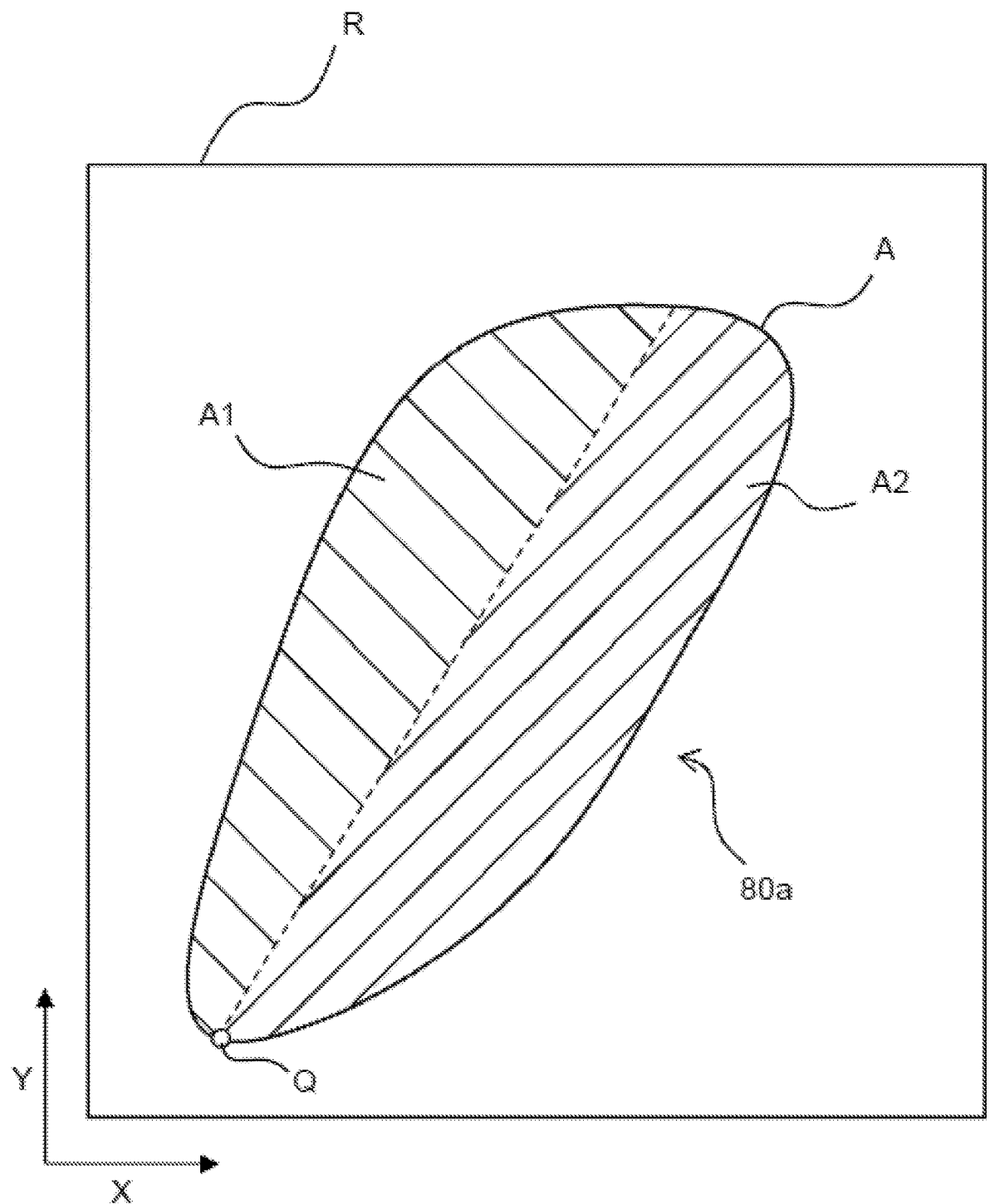
FIG. 10 illustrates an example of an irradiation region irradiated by the irradiation device 13 according to the first embodiment.

FIG. 9 is a schematic view illustrating the position relationship between the irradiation device 13 and the molding region R according to the embodiment from a top perspective. The respective galvano mirrors 32a, 32b, 42a, and 42b are positioned above the substantially central position of the molding region R. In this state, by irradiating the laser beams L1 and L2 to a predetermined irradiation region A of the material layer 8, the material layer 8 is solidified, and a first solidified layer 80a is obtained as shown in FIG. 10. The irradiation region A is the irradiation range of the laser beams L1 and L2 in each divided layer in the molding region R, and is substantially uniform with the region defined by a contour shape of the solidified layer in each divided layer.

Figure 11:
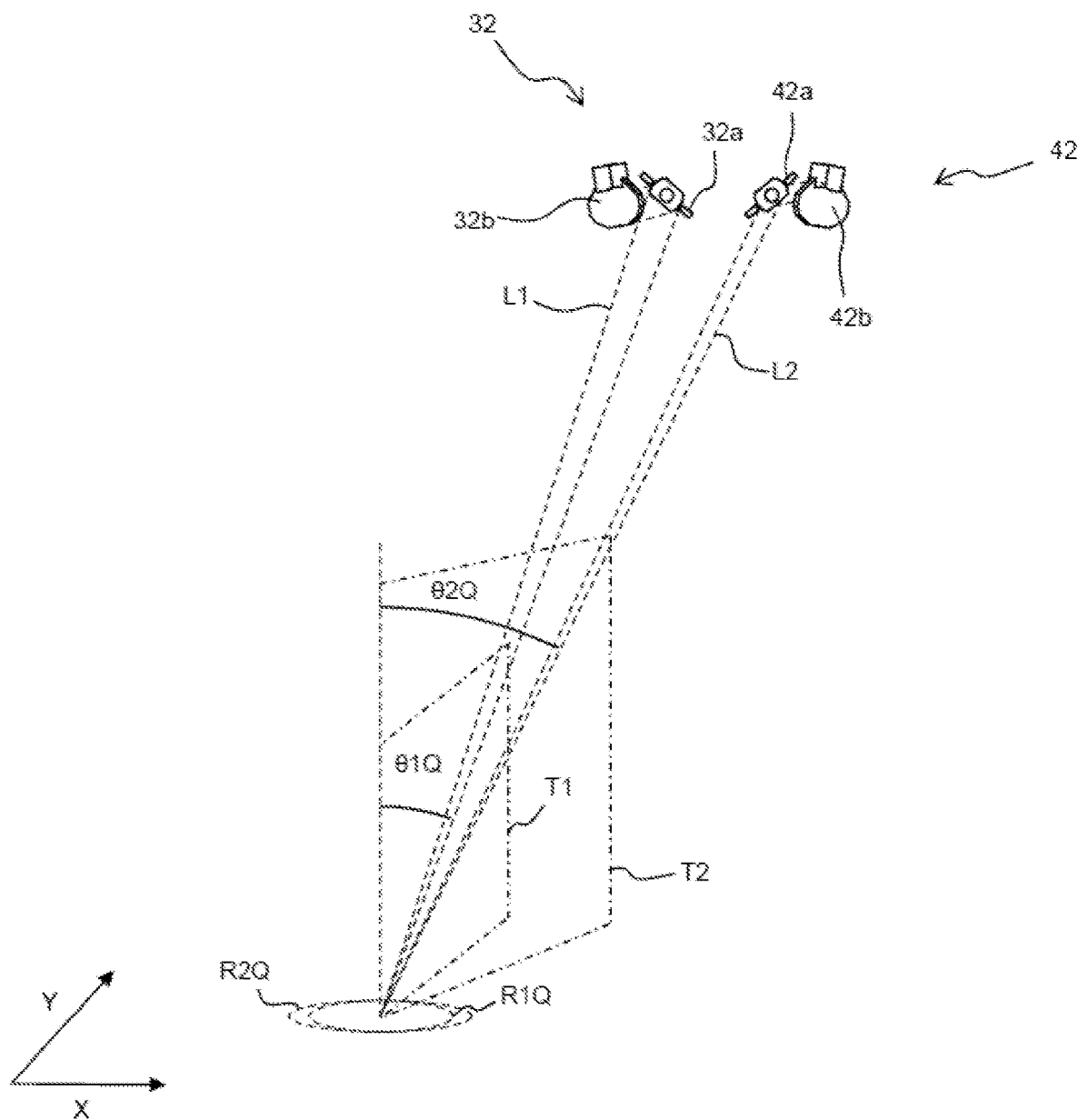
FIG. 11 illustrates paths of laser beams L1 and L2 when irradiating a point Q in the irradiation region of FIG. 10.

FIG. 11 is a view that illustrates the paths of the laser beams L1 and L2 when a point Q in the irradiation region A of FIG. 10 is irradiated with the laser beams L1 and L2. A second incident angle $\theta 2Q$ on an incident plane T2 of the laser beam L2 irradiated to the point Q by the second galvano scanner 42 is greater than a first incident angle $\theta 1Q$ on an incident plane T1 of the laser beam L1 irradiated by the first galvano scanner 32 from a position closer to the point Q to the point Q. Therefore, an irradiation spot R2Q of the laser beam L2 at the point Q is greater than an irradiation spot R1Q of the laser beam L1 at the point Q, and an energy density of the irradiation spot R2Q is smaller than an energy density of the irradiation spot R1Q.

When the difference in shape and energy density between the irradiation spots R1 and R2 of the laser beams L1 and L2 at the time of irradiating the same position in the molding region R is great, variations in molding quality occur according to the selection of laser beam. In the embodiment, by configuring the first galvano scanner 32 and the second galvano scanner 42 so that the first X-axis galvano mirror 32a and the first Y-axis galvano mirror 32b and the second X-axis galvano mirror 42a and the second Y-axis galvano mirror 42b are plane-symmetric to each other, and reducing the distance between the reflected positions of the laser beams L1 and L2 on the downstream side, the shapes of the irradiation spots R1 and R2 are unified, and the difference in energy density at the time of irradiating the predetermined position is alleviated.

In addition, in the embodiment, at the irradiation positions of the molding region R, the absolute value of the difference between the first incident angle $\theta 1$ and the second incident angle $\theta 2$ of the laser beams L1 and L2 may be configured as being constantly 7 degrees or less, preferably 3 degrees or less. With such configuration, the shapes of the irradiation spots R1 and R2 at the time of irradiating the same position can be substantially uniform, the difference in energy density between the laser beams L1 and L2 can be reduced, and the molding quality can be stabilized.

In addition, as described above, the irradiable ranges of the first galvano scanner 32 and the second galvano scanner 42 include the entire molding region R. Therefore, regardless of the shape of the molded object or the position of the molded object in the molding region R, the laser beams L1 and L2 from the first galvano scanner 32 and the second galvano scanner 42 can be simultaneously irradiated in different positions in the predetermined irradiation region A to increase the molding speed.

In the molding region A shown in FIG. 10 as an example, the irradiation region A is divided into two irradiation regions A1 and A2. The irradiation region A1 is irradiated by the laser beam L1, and the irradiation region A2 is irradiated by the laser beam L2. The irradiation area in the irradiation region A is set as an entire irradiation area S, and the irradiation areas in the irradiation regions A1 and A2 are respectively set as a first irradiation area S1 and a second irradiation area S2. By controlling the first galvano scanner 32 and the second galvano scanner 42 by the irradiation controller 30 so that the first irradiation area S1 and the second irradiation area S2 are substantially the same, the laser beams L1 and L2 can be irradiated efficiently, and the molding speed can be increased. Preferably, the irradiation controller 30 may control the first galvano scanner 32 and the second galvano scanner 42 so that the proportions of the first irradiation area S1 with respect to the entire irradiation area S and the second irradiation area S2 with respect to the entire irradiation area S in the predetermined divided layer may be respectively from 40% to 60% inclusive, preferably from 45% to 55% inclusive. Moreover, it is preferable that the divided layers in which the first irradiation area S1 and the second irradiation area S2 are substantially the same may be substantially all the divided layers in the desired three-dimensional molded object. Specifically, it is desirable that the first galvano scanner 32 and the second galvano scanner 42 may be controlled so that the first irradiation area S1 and the second irradiation area S2 may be substantially the same in 80% or more of the divided layers, more preferably 90% of the divided layers, even more preferably all of the divided layers.

Figure 12:
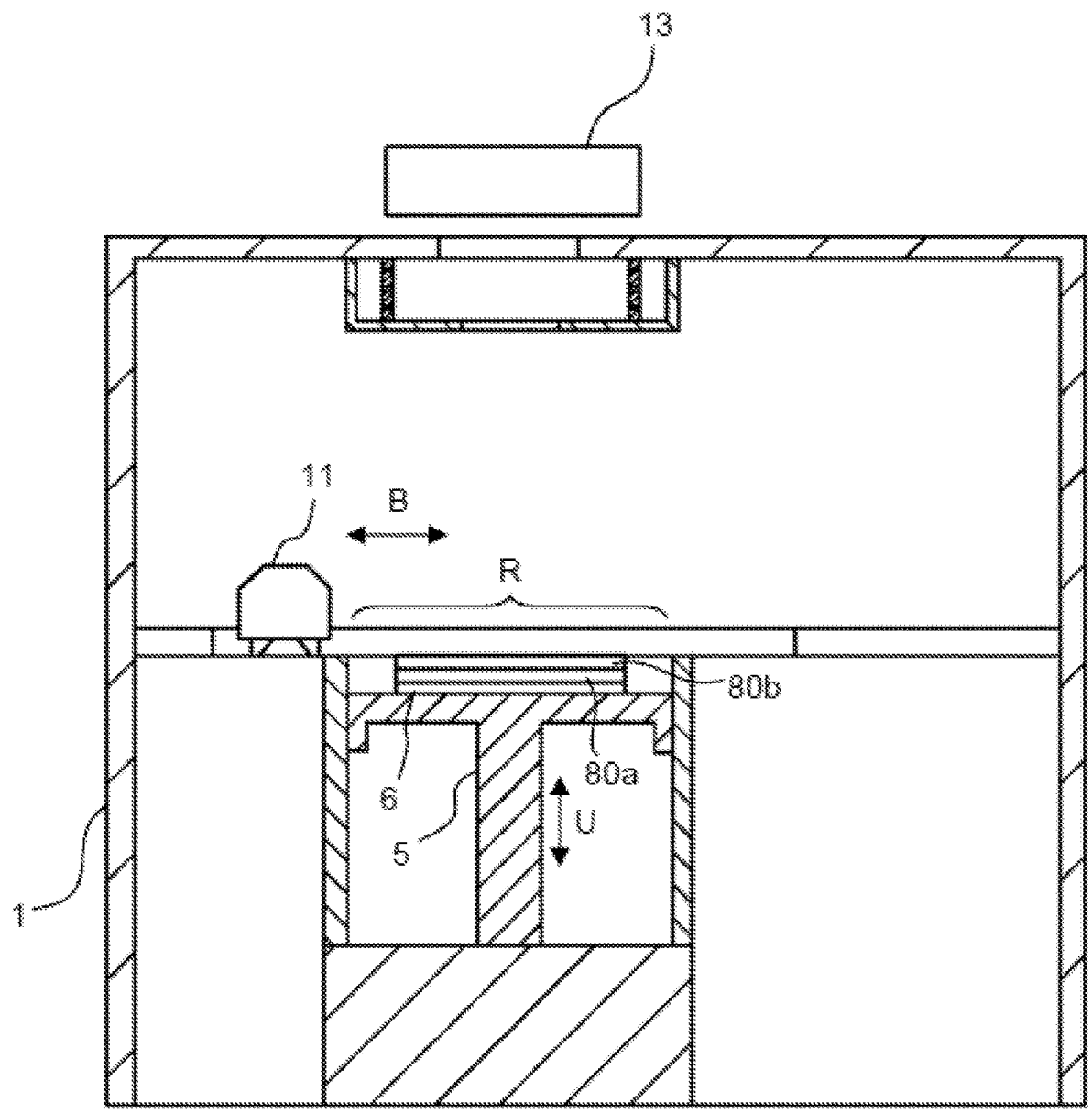
FIG. 12 illustrates a lamination molding method using the lamination molding apparatus according to the first embodiment of the disclosure.

After the first solidified layer 80a is formed, the height of the molding table 5 is lowered by one layer of the material layer 8. In this state, the recoater head 11 is moved from the right side of the molding region R to the left side, and a second material layer 8 is formed on the molding table 5 to cover the first solidified layer 80a. Then, by using the same method, as shown in FIG. 12, a second solidified layer 80b is obtained by irradiating the laser beams L1 and L2 to a predetermined portion in the material layer 8 for solidifying.

By repeating the above process, third and later solidified layers are formed. The adjacent solidified layers are firmly fixed to each other.

After or during the molding of the three-dimensional molded object, by using a cutting apparatus (not shown) disposed in the chamber 1, a machining process may be performed on the surface or an undesired portion of a solidified object obtained by laminating the solidified layers. After the lamination molding is completed, by discharging the material powder that is not solidified and cutting chips, the molded object can be obtained.

Although the exemplary embodiment of the disclosure has been described above, the disclosure is not limited to the above-described embodiment, and various design changes are possible within the scope of the claims. For example, the disclosure may also be implemented in the following modes.

The irradiation device 13 according to the first embodiment includes two galvano scanners consisting of the first galvano scanner 32 and the second galvano scanner 42. However, the number of the galvano scanners included in the irradiation device is not limited to two. For example, the irradiation device may also be configured as including four galvano scanners.

Figure 13:
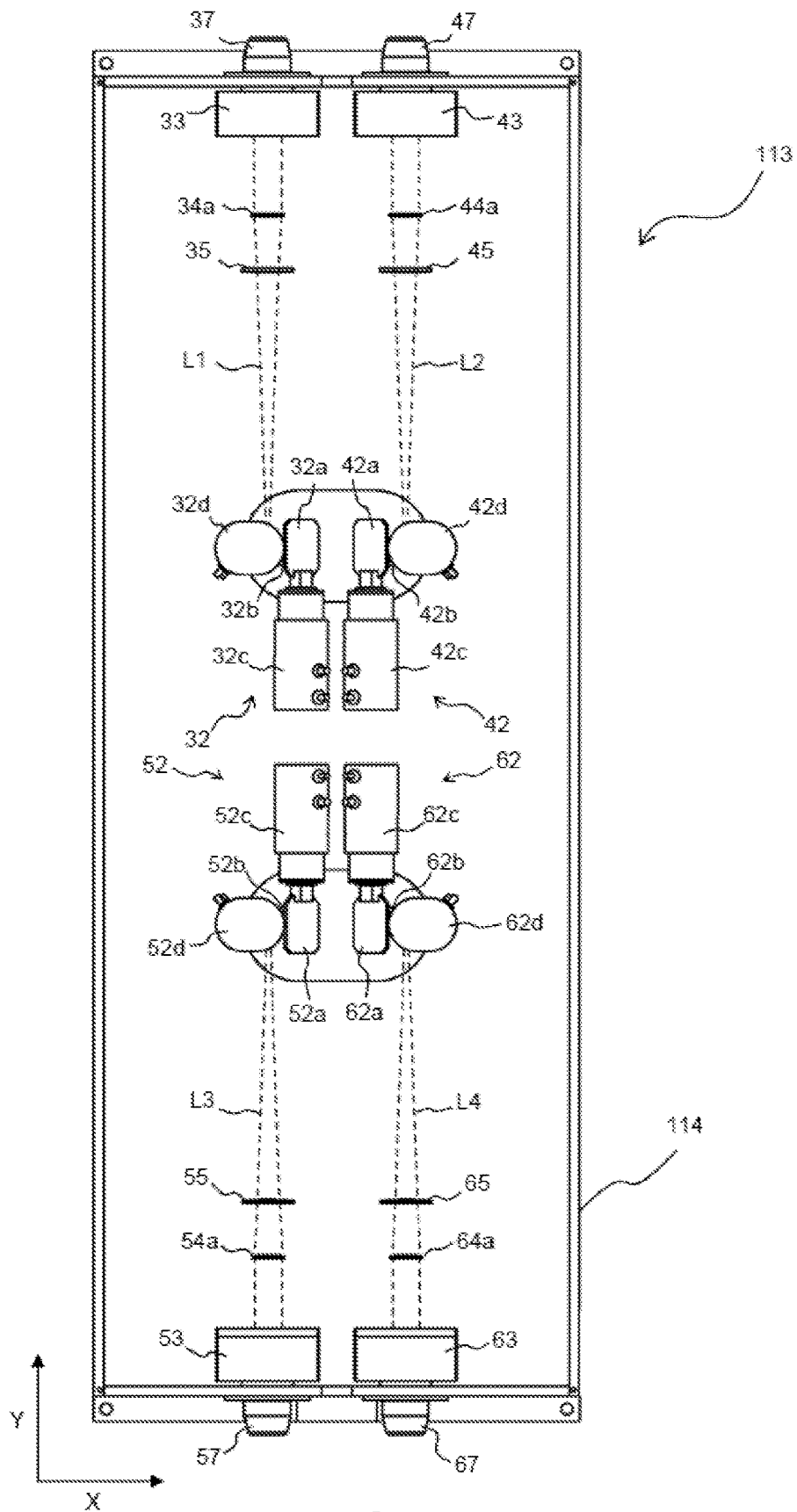
FIG. 13 is a schematic view illustrating the configuration of an irradiation device 113 of a lamination molding apparatus according to a second embodiment of the disclosure.

FIG. 13 is a schematic view illustrating the configuration of an irradiation device 113 according to a second embodiment of the disclosure, and illustrates the configuration of a portion of components when the irradiation device 113 is viewed from a top perspective. In such configuration, in addition to the first galvano scanner 32 and the second galvano scanner, which is the same as the configuration of the first embodiment, the irradiation device 113 also include a third galvano scanner 52 and a fourth galvano scanner 62.

The third galvano scanner 52 and the fourth galvano scanner 62 are controlled by the irradiation controller 30 and scan laser beams L3 and L4, respectively. A third laser source not shown herein is connected with a third aperture 53 via a connector 57 disposed on the back surface of a casing 114. A fourth laser source not shown herein is connected with a fourth aperture 63 via a connector 67 disposed on the back surface of the casing 114. The laser beams L3 and L4 generated by the third light source and the fourth light source respectively pass through the third aperture 53 and the fourth aperture 63, respectively pass through respective focus control lenses 54a and 64a of a third focus control unit and a fourth focus control unit and a third adjustment lens 55 and a fourth adjustment lens 65 to be condensed, and are incident to the third galvano scanner 52 and the fourth galvano scanner 62. In the casing 114, a control substrate electrically connected with the third galvano scanner 52 and the third focus control unit and a control substrate electrically connected with the fourth galvano scanner 62 and the fourth focus control unit are disposed. The functions and configurations of these components of the irradiation device 113 are the same as the functions and configurations of the components of the irradiation device 13 of the first embodiment. Therefore, details in this regard will be omitted. In addition, these components are integrally disposed in the casing 114. In other words, the first galvano scanner 32, the second galvano scanner 42, the third galvano scanner 52, and the fourth galvano scanner 62 are accommodated in the single casing 114.

The third galvano scanner 52 includes a third X-axis galvano mirror 52a that scans the laser beam L3 in the X-axis direction, a third X-axis actuator 52c that rotates the third X-axis galvano mirror 52a, a third Y-axis galvano mirror 52b that scans the laser beam L3 in the Y-axis direction, and a third Y-axis actuator 52d that rotates the third Y-axis galvano mirror 52b.

The fourth galvano scanner 62 includes a fourth X-axis galvano mirror 62a that scans the laser beam L4 in the X-axis direction, a fourth X-axis actuator 62c that rotates the fourth X-axis galvano mirror 62a, a fourth Y-axis galvano mirror 62b that scans the laser beam L4 in the Y-axis direction, and a fourth Y-axis actuator 62d that rotates the fourth Y-axis galvano mirror 62b.

The third galvano scanner 52 and the fourth galvano scanner 62 are configured as being capable of irradiating any position in the molding region R. In other words, the irradiable range of the third galvano scanner 52 and the fourth galvano scanner 62 include the entire molding region R.

In addition, the third X-axis galvano mirror 52a and the third Y-axis galvano mirror 52b of the third galvano scanner 52 and the fourth X-axis galvano mirror 62a and the fourth Y-axis galvano mirror 62b of the fourth galvano scanner 62 are disposed to be plane-symmetric to each other. The third X-axis galvano mirror 52a and the third Y-axis galvano mirror 52b of the third galvano scanner 52 and the fourth X-axis galvano mirror 62a and the fourth Y-axis galvano mirror 62b of the fourth galvano scanner 62 are disposed to be plane-symmetric to each other with respect to the symmetry plane P which is perpendicular to the molding region R, so that a distance between the downstream galvano mirror of the third X-axis galvano mirror 52a and the third Y-axis galvano mirror 52b of the third galvano scanner 52 (i.e., the third X-axis galvano mirror 52a in the embodiment) and the downstream galvano mirror of the fourth X-axis galvano mirror 62a and the fourth Y-axis galvano mirror 62b of the fourth galvano scanner 62 (i.e., the fourth X-axis galvano mirror 62a in the embodiment) is smaller than a distance between the upstream galvano mirror of the third X-axis galvano mirror 52a and the third Y-axis galvano mirror 52b of the third galvano scanner 52 (i.e., the third Y-axis galvano mirror 52b in the embodiment) and the upstream galvano mirror of the fourth X-axis galvano mirror 62a and the fourth Y-axis galvano mirror 62b of the fourth galvano scanner 62 (i.e., the fourth Y-axis galvano mirror 62b in the embodiment). In addition, it is preferably configured so that the reflected positions of the laser beams L1, L2, L3 and L4 of the downstream galvano mirrors of the first galvano scanner 32, the second galvano scanner 42, the third galvano scanner 52, and the fourth galvano scanner 62 are positioned above the substantially central position of the molding region R.

The third galvano scanner 52 and the fourth galvano scanner 62 are configured so that the structural relationship therebetween is the same as the structural relationship between the first galvano scanner 32 and the second galvano scanner 42. That is, for the third galvano scanner 52 and the fourth galvano scanner 62, it is preferable that a distance between reflected positions of the laser beams L3 and L4 on the downstream side in the respective galvano scanners 52 and 62 be shorter. Specifically, it is preferable that the respective galvano scanners 52 and 62 may be disposed so that the distance between the third reflected position of the laser beam L3 of the downstream galvano mirror of the third X-axis galvano mirror 52a and the third Y-axis galvano mirror 52b of the third galvano scanner 52 (i.e., the reflected position in the third X-axis galvano mirror 52a in the embodiment) and the fourth reflected position of the laser beam L4 of the downstream galvano mirror of the fourth X-axis galvano mirror 62a and the fourth Y-axis galvano mirror 62b of the fourth galvano scanner 62 (i.e., the reflected position in the fourth X-axis galvano mirror 62a in the embodiment), when the laser beams L3 and L4 are irradiated, is preferably constantly 150 mm or less, and more preferably 100 mm or less.

In addition, when a third incident angle of the laser beam L3 on an incident plane at the time when the laser beam L3 is irradiated to a predetermined position in the molding region R by the third galvano scanner 52 with respect to the vertical direction is set as $\theta 3[°]$, and a fourth incident angle of the laser beam L4 on an incident plane at the time when the laser beam L4 is irradiated to a predetermined position in the molding region R by the fourth galvano scanner 42 with respect to the vertical direction is set as $\theta 4[°]$, in order to reduce the difference in shapes of irradiation spots or energy densities, it is desirable that the difference between the third incident angle $\theta 3$ and the fourth incident angle $\theta 4$ be smaller. In the embodiment, the irradiation device 113 is configured so that, at any position in the molding region R, the absolute value of the difference between the third incident angle $\theta 3$ and the fourth incident angle $\theta 4$ at the time when the laser beams L3 and L4 are irradiated is constantly 7 degrees or less, and more preferably 3 degrees or less.

In the case where a lamination molded object is manufactured by using the lamination molding apparatus according to the second embodiment, by irradiating the laser beams L1, L2, L3, and L4 to the predetermined irradiation region A of the material layer 8, the material layer 8 is solidified, and a solidified layer is obtained. By dividing the irradiation region A into four irradiation regions, i.e., irradiation regions A1, A2, A3, and A4, the irradiation regions A1, A2, A3, and A4 are respectively irradiated with the laser beams L1, L2, L3, and L4. The irradiation area in the irradiation region A is set as the entire irradiation area S, and the irradiation areas in the irradiation regions A1, A2, A3, and A4 are respectively set as the first irradiation area S1, the second irradiation area S2, a third irradiation area S3, and a fourth irradiation area S4. By controlling the first galvano scanner 32, the second galvano scanner 42, the third galvano scanner 52, and the fourth galvano scanner 62 by the irradiation controller 30 so that the first irradiation area S1, the second irradiation area S2, the third irradiation area S3, and the fourth irradiation area S4 are substantially the same, the laser beams L1, L2, L3, and L4 can be irradiated efficiently, and the molding speed can be increased. Preferably, the irradiation controller 30 may control the first galvano scanner 32, the second galvano scanner 42, the third galvano scanner 52, and the fourth galvano scanner 62, so that the proportions of the first irradiation area S1, the second irradiation area S2, the third irradiation area S3, and the fourth irradiation area S4 with respect to the entire irradiation area S in the predetermined divided layer may be respectively from 20% to 30% inclusive, and preferably from 22.5% to 27.5% inclusive. Moreover, it is preferable that the divided layers in which the first irradiation area S1, the second irradiation area S2, the third irradiation area S3, and the fourth irradiation area S4 are substantially the same may be substantially all the divided layers in the desired three-dimensional molded object. Specifically, it is desirable that the first galvano scanner 32, the second galvano scanner 42, the third galvano scanner 52, and the fourth galvano scanner 62 may be controlled so that the first irradiation area S1, the second irradiation area S2, the third irradiation area S3, and the fourth irradiation area S4 are substantially the same in 80% or more of the divided layers, more preferably 90% of the divided layers, and even more preferably all the divided layers. In addition, it is desirable that the laser beam L1 scanned by the first galvano scanner 32, the laser beam L2 scanned by the second galvano scanner 42, the laser beam L3 scanned by the third galvano scanner 52, and the laser beam L4 scanned by the fourth galvano scanner 32 may pass through the single chamber window 1a.

Even in the second embodiment, the shape difference in the irradiation spots and the energy densities among the laser beams L1, L2, L3, and L4 can be reduced according to the above configuration, and the molding quality can be stabilized. In addition, since the laser beams L1, L2, L3, and L4 from the four galvano scanners can be simultaneously irradiated to different positions of the irradiation region, the molding speed can be increased.

What is claimed is:
1. A lamination molding apparatus, comprising:
a chamber, configured to cover a molding region; and
an irradiation device, configured to, in each divided layer formed by dividing a three-dimensional molded object at a predetermined height, irradiate a first laser beam and a second laser beam to a material layer formed in the molding region to form a solidified layer,
wherein the irradiation device comprises:
a first laser source, configured to generate the first laser beam;
a first galvano scanner, configured to scan the first laser beam;
a second laser source, configured to generate the second laser beam;
a second galvano scanner, configured to scan the second laser beam;
a third laser source, configured to generate a third laser beam;
a third galvano scanner, configured to scan the third laser beam;
a fourth laser source, configured to generate a fourth laser beam;
a fourth galvano scanner, configured to scan the fourth laser beam; and
an irradiation controller, configured to control the first laser source, the second laser source, the third laser source, the fourth laser source, the first galvano scanner, the second galvano scanner, the third galvano scanner and the fourth galvano scanner,
the first galvano scanner comprises:
a first X-axis galvano mirror, configured to scan the first laser beam in an X-axis direction;
a first X-axis actuator, configured to rotate the first X-axis galvano mirror;
a first Y-axis galvano mirror, configured to scan the first laser beam in a Y-axis direction perpendicular to the X-axis direction; and
a first Y-axis actuator, configured to rotate the first Y-axis galvano mirror, and
the second galvano scanner comprises:
a second X-axis galvano mirror, configured to scan the second laser beam in the X-axis direction;
a second X-axis actuator, configured to rotate the second X-axis galvano mirror;
a second Y-axis galvano mirror, configured to scan the second laser beam in the Y-axis direction; and
a second Y-axis actuator, configured to rotate the second Y-axis galvano mirror,
irradiable ranges of the first laser beam and the second laser beam by using the first galvano scanner and the second galvano scanner respectively include an entirety of the molding region, and
the first X-axis galvano mirror and the first Y-axis galvano mirror are disposed to be plane-symmetric to the second X-axis galvano mirror and the second Y-axis galvano mirror with respect to a symmetry plane which is perpendicular to the molding region, so that a distance between a first downstream galvano mirror and a second downstream galvano mirror is smaller than a distance between a first upstream galvano mirror and a second upstream galvano mirror, wherein
the first upstream galvano mirror is one of the first X-axis galvano mirror and the first Y-axis galvano mirror which is relatively disposed on upstream, and the first downstream galvano mirror is the other of the first X-axis galvano mirror and the first Y-axis galvano mirror which is relatively disposed on downstream, when a relative position close to the first laser source is set as upstream and a relative position close to the material layer is set as downstream along a path of the first laser beam;
the second upstream galvano mirror is one of the second X-axis galvano mirror and the second Y-axis galvano mirror which is relatively disposed on upstream, and the second downstream galvano mirror is the other of the second X-axis galvano mirror and the second Y-axis galvano mirror which is relatively disposed on downstream when a relative position close to the second laser source is set as upstream and a relative position close to the material layer is set as downstream along a path of the second laser beam; and
a distance between a first reflected position which is a reflected position of the first laser beam on the first downstream galvano mirror and a second reflected position which is a reflected position of the second laser beam on the second downstream galvano mirror is configured to be 150 mm or less, wherein the reflected position of the first laser beam is a position where the first laser beam is reflected on the first downstream galvano mirror, and the reflected position of the second laser beam is a position where the second laser beam is reflected on the second downstream galvano mirror, the third galvano scanner comprises:

a third X-axis galvano mirror, configured to scan the third laser beam in the X-axis direction;

a third X-axis actuator, configured to rotate the third X-axis galvano mirror;

a third Y-axis galvano mirror, configured to scan the third laser beam in the Y-axis direction perpendicular to the X-axis direction; and a third Y-axis actuator, configured to rotate the third Y-axis galvano mirror, the fourth galvano scanner comprises:

a fourth X-axis galvano mirror, configured to scan the fourth laser beam in the X-axis direction;

a fourth X-axis actuator, configured to rotate the fourth X-axis galvano mirror;

a fourth Y-axis galvano mirror, configured to scan the fourth laser beam in the Y-axis direction; and a fourth Y-axis actuator, configured to rotate the fourth Y-axis galvano mirror, irradiable ranges of the third laser beam and the fourth laser beam by using the third galvano scanner and the fourth galvano scanner respectively include the entire entirety of the molding region, and the third X-axis galvano mirror and the third Y-axis galvano mirror are disposed to be plane-symmetric to the fourth X-axis galvano mirror and the fourth Y-axis galvano mirror with respect to a symmetry plane which is perpendicular to the molding region, so that a distance between a third downstream galvano mirror and a fourth downstream galvano mirror is smaller than a distance between a third upstream galvano mirror and a fourth upstream galvano mirror, wherein the third upstream galvano mirror is one of the third X-axis galvano mirror and the third Y-axis galvano mirror which is relatively disposed on upstream, and the third downstream galvano mirror is the other of the third X-axis galvano mirror and the third Y-axis galvano mirror which is relatively disposed on downstream, when a relative position close to the third laser source is set as upstream and a relative position close to the material layer is set as downstream along a path of the third laser beam;

the fourth upstream galvano mirror is one of the fourth X-axis galvano mirror and the fourth Y-axis galvano mirror which is relatively disposed on upstream, and the fourth downstream galvano mirror is the other of the fourth X-axis galvano mirror and the fourth Y-axis galvano mirror which is relatively disposed on downstream when a relative position close to the fourth laser source is set as upstream and a relative position close to the material layer is set as downstream along a path of the fourth laser beam; and a distance between a third reflected position which is a reflected position of the third laser beam on the third downstream galvano mirror and a fourth reflected position which is a reflected position of the fourth laser beam on the fourth downstream galvano mirror is configured to be 150 mm or less, wherein the reflected position of the third laser beam is a position where the third laser beam is reflected on the third downstream galvano mirror, and the reflected position of the fourth laser beam is a position where the fourth laser beam is reflected on the fourth downstream galvano mirror;

wherein lamination molding apparatus further comprises:

a single casing, configured to accommodate the first galvano scanner, the second galvano scanner, the third galvano scanner, and the fourth galvano scanner, the first galvano scanner, the second galvano scanner, the third galvano scanner, and the fourth galvano scanner are fixed on the single casing and arranged so that the first reflected position, the second reflected position, the third reflected position and the fourth reflected position are at a same height from the material layer.

2. The lamination molding apparatus as claimed in claim 1, wherein the distance between the first reflected position and the second reflected position is configured to be 100 mm or less.

3. The lamination molding apparatus as claimed in claim 1, wherein an absolute value of a difference between a first incident angle of the first laser beam when the first laser beam is irradiated by the first galvano scanner to a predetermined position in the molding region and a second incident angle of the second laser beam when the second laser beam is irradiated by the second galvano scanner to the predetermined position in the molding region is configured to be 7 degrees or less.

4. The lamination molding apparatus as claimed in claim 3, wherein the absolute value of the difference between the first incident angle and the second incident angle is configured to be 3 degrees or less.

5. The lamination molding apparatus as claimed in claim 1, wherein the irradiation controller is configured to control the first galvano scanner and the second galvano scanner, so that in the predetermined divided layer, a proportion of a first irradiation area of the first laser beam by using the first galvano scanner with respect to an entire irradiation area and a proportion of a second irradiation area of the second laser beam by using the second galvano scanner with respect to the entire irradiation area are respectively from 40% to 60% inclusive.

6. The lamination molding apparatus as claimed in claim 5, wherein the irradiation controller is configured to control the first galvano scanner and the second galvano scanner, so that in the predetermined divided layer, the proportion of the first irradiation area with respect to the entire irradiation area and the proportion of the second irradiation area with respect to the entire irradiation area are respectively from 45% to 55% inclusive.

7. The lamination molding apparatus as claimed in claim 1, further comprising:

a single chamber window, disposed on a top surface of the chamber, wherein the first laser beam scanned by the first galvano scanner and the second laser beam scanned by the second galvano scanner are configured to pass through the single chamber window.

8. The lamination molding apparatus as claimed in claim 1, wherein the distance between the third reflected position and the fourth reflected position is configured to be 100 mm or less.

9. The lamination molding apparatus as claimed in claim 1, wherein an absolute value of a difference between a third incident angle of the third laser beam when the third laser beam is irradiated by the third galvano scanner to a predetermined position in the molding region and a fourth incident angle of the fourth laser beam when the fourth laser beam is irradiated by the fourth galvano scanner to the predetermined position in the molding region is configured to be 7 degrees or less.

10. The lamination molding apparatus as claimed in claim 9, wherein the absolute value of the difference between the third incident angle and the fourth incident angle is configured to be 3 degrees or less.

11. The lamination molding apparatus as claimed in claim 1, wherein the irradiation controller is configured to control the first galvano scanner, the second galvano scanner, the third galvano scanner, and the fourth galvano scanner, so that in the predetermined divided layer, a proportion of a first irradiation area of the first laser beam by the first galvano scanner with respect to an entire irradiation area, a proportion of a second irradiation area of the second laser beam by the second galvano scanner with respect to the entire irradiation area, a proportion of a third irradiation area of the third laser beam by the third galvano scanner with respect to the entire irradiation area, and a proportion of a fourth irradiation area of the fourth laser beam by the fourth galvano scanner with respect to the entire irradiation area are respectively from 20% to 30% inclusive.

12. The lamination molding apparatus as claimed in claim 11, wherein the irradiation controller is configured to control the first galvano scanner, the second galvano scanner, the third galvano scanner, and the fourth galvano scanner, so that in the divided layer, the proportion of the first irradiation area with respect to the entire irradiation area, the proportion of the second irradiation area with respect to the entire irradiation area, the proportion of the third irradiation area with respect to the entire irradiation area, and the proportion of the fourth irradiation area with respect to the entire irradiation area are respectively from 22.5% to 27.5% inclusive.

13. The lamination molding apparatus as claimed in claim 1, further comprising:
a single chamber window, disposed on a top surface of the chamber, wherein the first laser beam scanned by the first galvano scanner, the second laser beam scanned by the second galvano scanner, the third laser beam scanned by the third galvano scanner, and the fourth laser beam scanned by the fourth galvano scanner are configured to pass through the single chamber window.

14. The lamination molding apparatus as claimed in claim 1, wherein a group including the first X-axis galvano mirror, the first Y-axis galvano mirror, the second X-axis galvano mirror and the second Y-axis galvano mirror and a group including the third X-axis galvano mirror, the third Y-axis galvano mirror, the fourth X-axis galvano mirror and the fourth Y-axis galvano mirror face each other.

15. The lamination molding apparatus as claimed in claim 1, further comprising:
a single chamber window, disposed on a top surface of the chamber,
the first laser beam scanned by the first galvano scanner, the second laser beam scanned by the second galvano scanner, the third laser beam scanned by the third galvano scanner, and the fourth laser beam scanned by the fourth galvano scanner are configured to pass through the single chamber window,
wherein a group including the first X-axis galvano mirror, the first Y-axis galvano mirror, the second X-axis galvano mirror and the second Y-axis galvano mirror and a group including the third X-axis galvano mirror, the third Y-axis galvano mirror, the fourth X-axis galvano mirror and the fourth Y-axis galvano mirror face each other, so that the first galvano scanner is closer the single chamber window than the first laser source, the second galvano scanner is closer the single chamber window than the second laser source, the third galvano scanner is closer the single chamber window than the third laser source, and the fourth galvano scanner is closer the single chamber window than the fourth laser source.

\* \* \* \* \*